(12) United States Patent
Nichols et al.

(10) Patent No.: US 6,779,346 B2
(45) Date of Patent: Aug. 24, 2004

(54) CONTROL OF GAS TURBINE COMBUSTION TEMPERATURE BY COMPRESSOR BLEED AIR

(75) Inventors: Richard Lee Nichols, Greenville, SC (US); Bruce G. Norman, Charlton, NY (US); Kevin Michael Elward, Simpsonville, SC (US); Roointon Erach Pavri, Waleska, GA (US); Benjamin Rush, Schenectady, NY (US); Robert Edward Boettner, Glenville, NY (US); John P. VanDevelde, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/314,438

(22) Filed: Dec. 9, 2002

(65) Prior Publication Data

US 2004/0107702 A1 Jun. 10, 2004

(51) Int. Cl.[7] .................................................. F02C 9/18
(52) U.S. Cl. ........................................... 60/782; 60/795
(58) Field of Search ............................ 60/772, 782, 785, 60/794, 795

(56) References Cited

U.S. PATENT DOCUMENTS

| | | | |
|---|---|---|---|
| 4,982,564 A | | 1/1991 | Hines |
| 5,054,279 A | | 10/1991 | Hines |
| 5,117,625 A | * | 6/1992 | McArthur et al. ............ 60/785 |
| 5,289,685 A | | 3/1994 | Hoffa |
| 5,303,542 A | | 4/1994 | Hoffa |
| 5,560,195 A | | 10/1996 | Anderson et al. |
| 5,581,996 A | | 12/1996 | Koch et al. |
| 5,685,157 A | | 11/1997 | Pandalai et al. |
| 5,743,079 A | | 4/1998 | Walsh et al. |
| 5,816,049 A | | 10/1998 | Joshi |
| 5,839,267 A | | 11/1998 | Schonewald et al. |
| 5,896,741 A | * | 4/1999 | Etheridge .................... 60/794 |
| 5,911,679 A | | 6/1999 | Farrell et al. |
| 6,003,296 A | | 12/1999 | Citeno et al. |
| 6,311,471 B1 | | 11/2001 | Waldherr et al. |
| 6,449,953 B1 | | 9/2002 | Hook, Jr. et al. |

* cited by examiner

Primary Examiner—Louis J. Casaregola
(74) Attorney, Agent, or Firm—Nixon & Vanderhye P.C.

(57) ABSTRACT

A method of operating a combustor in a gas turbine that receives combustion air from a compressor includes a) controlling combustion temperature as a function of compressor discharge air bled from the compressor by determining a minimum amount of compressor discharge air required for maintaining a predetermined minimum combustion temperature; and b) bleeding compressor discharge air in excess of the minimum amount from the compressor via a control valve.

16 Claims, 6 Drawing Sheets

CONTROL OF GAS TURBINE COMBUSTION TEMPERATURE BY COMPRESSOR BLEED AIR

BACKGROUND OF THE INVENTION

This invention relates to gas turbine control technology and, more specifically, to the maintenance of high combustor temperatures in gas turbines for low emissions operation, particularly under part load or turndown conditions.

Proper operation of a Dry Low-NOx (DLN) combustion system requires a high combustor reference temperature, e.g., greater than 1675° F. in some gas turbine models. For gas turbines that do not have variable compressor inlet guide vanes, maintaining high combustor temperature can only be achieved for turbine loading down to about 90–92% of base load—via firing temperature control. At lower loads, the combustor reference temperature will decrease below the required value for optimum DLN system operation.

Each combustor in one conventional DLN combustion system is a two-stage (primary and secondary) premixed combustor designed for use with natural gas fuel and capable of operation on liquid fuel. The combustion system operates in four distinct modes:

1) Primary Fuel to the primary nozzles only—Flame is in the primary stage only. This mode of operation is used to ignite, accelerate and operate the machine over low- to mid-loads, up to a pre-selected combustion reference temperature.
2) Lean-Lean Fuel to both the primary and secondary nozzles—Flame is in both the primary and secondary stages. This mode of operation is used for intermediate loads between two pre-selected combustion reference temperatures.
3) Secondary Fuel to the secondary zone only—Flame is in the secondary zone only. This mode is a transition state- between lean-lean and premix modes. This mode is necessary to extinguish the flame in the primary zone, before fuel is reintroduced into what becomes the primary premixing zone.
4) Premix Fuel to both primary and secondary nozzles— Flame is in the secondary stage only. This mode of operation is achieved at and near the combustion-reference-temperature design point. Optimum emissions are generated in the premix mode.

The load range associated with these modes varies, but generally, the premix operating range is 50 percent to 100 percent load.

Currently, variable inlet guide vanes and inlet bleed heat are used to maintain gas turbine combustor temperature in a range for low emissions operation. There remains a need, however, for a control mechanism that will maintain high combustor reference temperature for DLN machines that do not have variable inlet guide vanes operating at part load conditions and thereby also maintain emissions requirements.

BRIEF DESCRIPTION OF THE INVENTION

In the exemplary embodiment of this invention, up to 20–22% of the compressor discharge air is bled off, thereby reducing the air available for combustion. This forces the turbine firing temperature to increase which allows the DLN combustion system to operate in its optimum premix mode. Operation in the premix mode keeps NOx at its lowest rated value.

More specifically, air is bled from the compressor discharge section uniformly around the circumference of the machine using up to 14 extraction locations. This allows uniform flow distribution within the combustion system. The amount of air extracted varies with several ambient and machine parameters. Control of the extraction air is via a stop and control valve, and the extracted air is bled into the gas turbine exhaust stack (or to any other area or system).

In the exemplary embodiment, five separate control modes, implemented by five software modules, provide input to a minimum value gate. One mode determines an input value based on process parameters that include compressor pressure ratio (CPR); turbine rotor speed; ambient temperature and a valve command reference value. A second mode provides an input value based on process parameters that include CPR; turbine exhaust gas temperature; and a valve command reference value. A third mode provides an input value based on temperature corrected turbine rotor speed and a valve command reference value. Fourth and fifth inputs provide input values based on mechanically set overrides.

The various input values to the minimum value gate represent a required valve stroke of the control valve.

The minimum value gate will select the input that reflects minimum valve stroke and hence the minimum amount of compressor discharge air that can be bled off according to the requirements of the particular software module in control.

The output signal from the minimum value gate will be input to an actuator system for the control valve that bleeds air from the compressor discharge air. The associated valve is employed to halt the extraction of bleed air in the event of faulty operation of the control valve.

The compressor air bleed system is designed to extract enough air to keep the machine firing temperature at a predetermined high value to keep the combustors operating in the premix mode. The system continuously modulates the air bleed control valve, thus allowing stable and optimum DLN combustion under loading varying from the rated base load (100%) value down to 65% of the base load value.

Accordingly, in its broader aspects, the invention relates to a method of operating a combustor in a gas turbine that receives combustion air from a compressor comprising a) controlling combustion temperature as a function of compressor discharge air bled from the compressor by determining a minimum amount of compressor discharge air required for maintaining a predetermined combustion temperature; and b) bleeding compressor discharge air in excess of the minimum amount from the compressor via a control valve.

In another aspect, the invention relates to method of operating a combustor in a gas turbine that receives combustion air from a compressor comprising: a) controlling combustion temperature as a function of compressor discharge air bled from the compressor by determining a minimum amount of compressor discharge air required for maintaining a predetermined minimum combustion temperature; and b) bleeding compressor discharge air in excess of the minimum from the compressor via a control valve; wherein step a) is carried out by using one or more process parameters to determine a bleed valve temperature reference and using that reference to determine required bleed flow, subject to overrides from other software modules acting through a minimum value selection function that compares multiple inputs, each based on one or more process parameters, and selecting that one of the multiple inputs that provides for the minimum amount of compressor discharge air; and wherein step b) includes bleeding air from multiple extraction locations spaced circumferentially about the compressor.

The invention will now be described in connection with the drawing figures identified below.

DETAILED DESCRIPTION OF THE INVENTION

Figure 1:
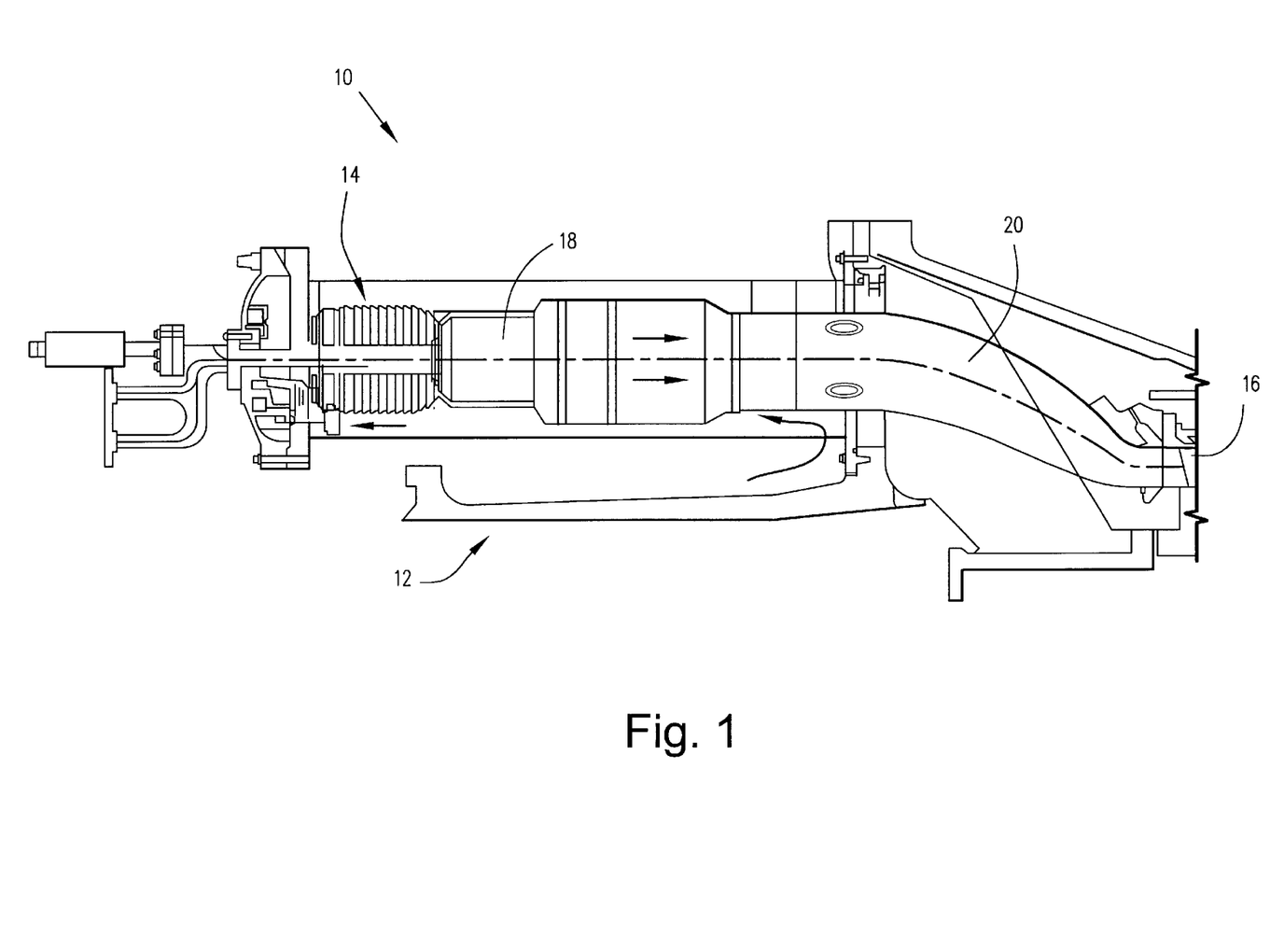
FIG. 1 is a cross section of a conventional DLN gas turbine combustor.

FIG. 1 schematically illustrates a typical can annular reverse-flow combustor 10 driven by the combustion gases from a fuel where a flowing medium with a high energy content, i.e., the combustion gases, produces a rotary motion as a result of being deflected by rings of blading mounted on a rotor. In operation, discharge air from the compressor 12 (compressed to a pressure on the order of about 100–400 lb/in$^2$) reverses direction as it passes over the outside of the combustors (one shown at 14) and again as it enters the combustor en route to the turbine, the first stage of which is indicated at 16 (see the flow arrows in FIG. 1). Note that only a part of the compressor frame is shown in FIG. 1. Compressed air and fuel are burned in the combustion chamber 18, producing gases with a temperature of about greater than 1675° F. in DLN combustion systems. These combustion gases flow at high velocity into turbine section 16 via transition piece 20.

Figure 2:
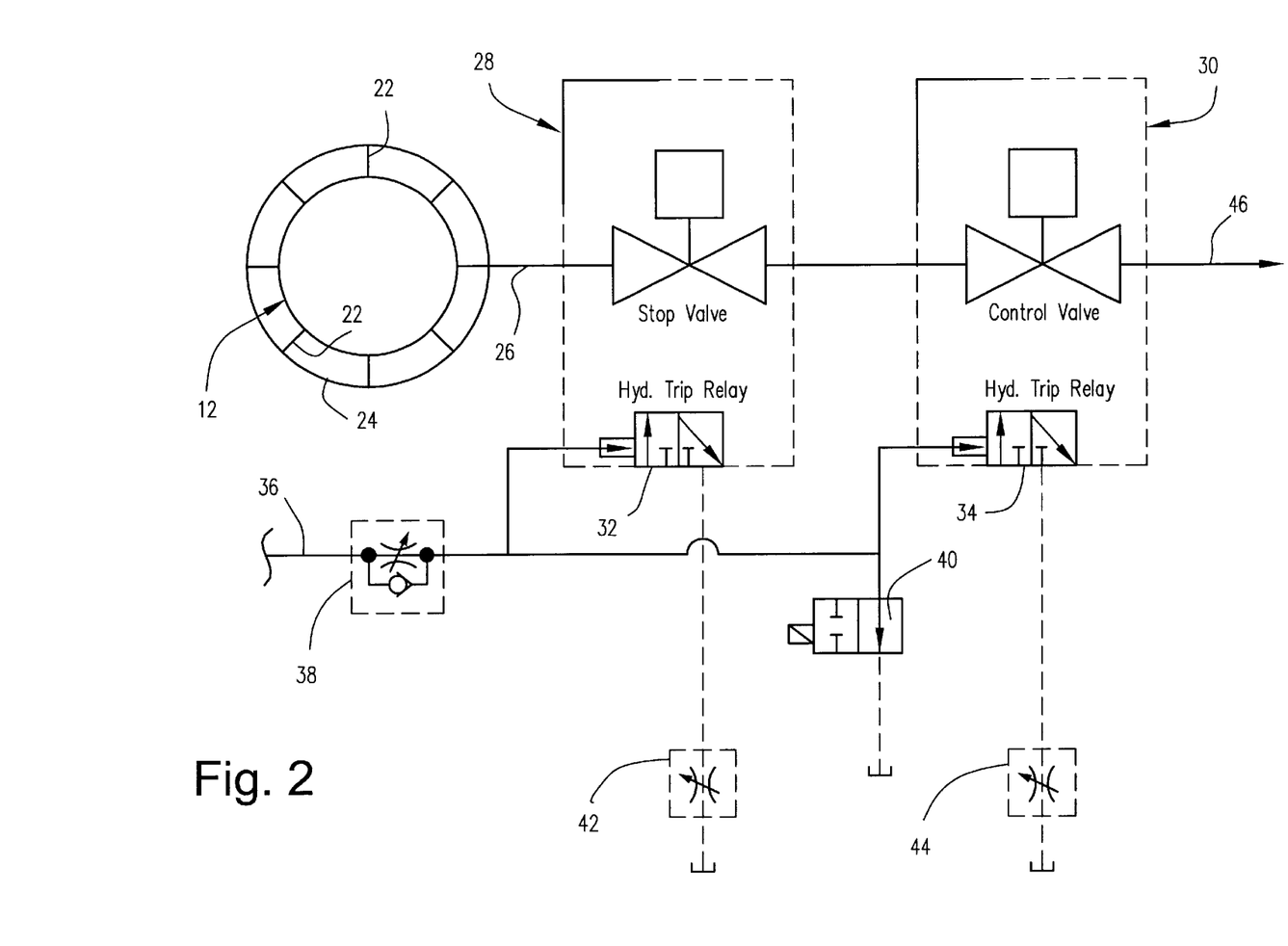
FIG. 2 is a schematic diagram of a control valve arrangement in accordance with the invention.

FIG. 2 illustrates in diagramatic form, the control valve arrangement for air extracted from the compressor 12 in accordance with an exemplary embodiment of the invention. Air is bled uniformly around the circumference of the compressor 12, using multiple extraction pipes or streams 22 leading to an annular compressor extraction manifold 24. This arrangement allows for uniform air flow distribution within the combustion system. The extraction streams 22 are combined into a single pipe or stream 26 on the outlet side of the manifold. The amount of extracted air is controlled by stop valve 28 and a bleed air control valve 30. Bleed air control valve 30 (or simply "control valve") continually adjusts the amount of air extracted from the compressor based on the control arrangement described below. Stop valve 28 provides a safety factor in that it will stop the flow of bleed air from the compressor 12 in the event of fault operation of the control valve 30 (for example, if the control valve becomes wholly or partially inoperable or is inadvertently opened). Stop valve 28 and control valve 30 are actuated by hydraulic trip relays 32, 34, respectively, which determine the rate at which the valves are closed. Oil under pressure is fed via line 36 through a flow regulating device 38 (incorporating a reduced orifice and a check valve) to the trip relays 32, 34 and oil is drained from the relays via drain valve 40. Thus, device 38 and drain valve 40 regulate the pressurization and depressurization of the trip relays. Field adjustable needle valves 42, 44 are employed to regulate the rate at which the relays are tripped, and thus, the rate at which valves 28, 30 open and close. Extracted air is bled into the gas turbine exhaust stack via pipe or stream 46. The extracted air could also be supplied to any other suitable area or system. It will also be appreciated that the control system described herein also allows for extracted air to be used for turbine cooling and bearing sealing.

Figure 3:
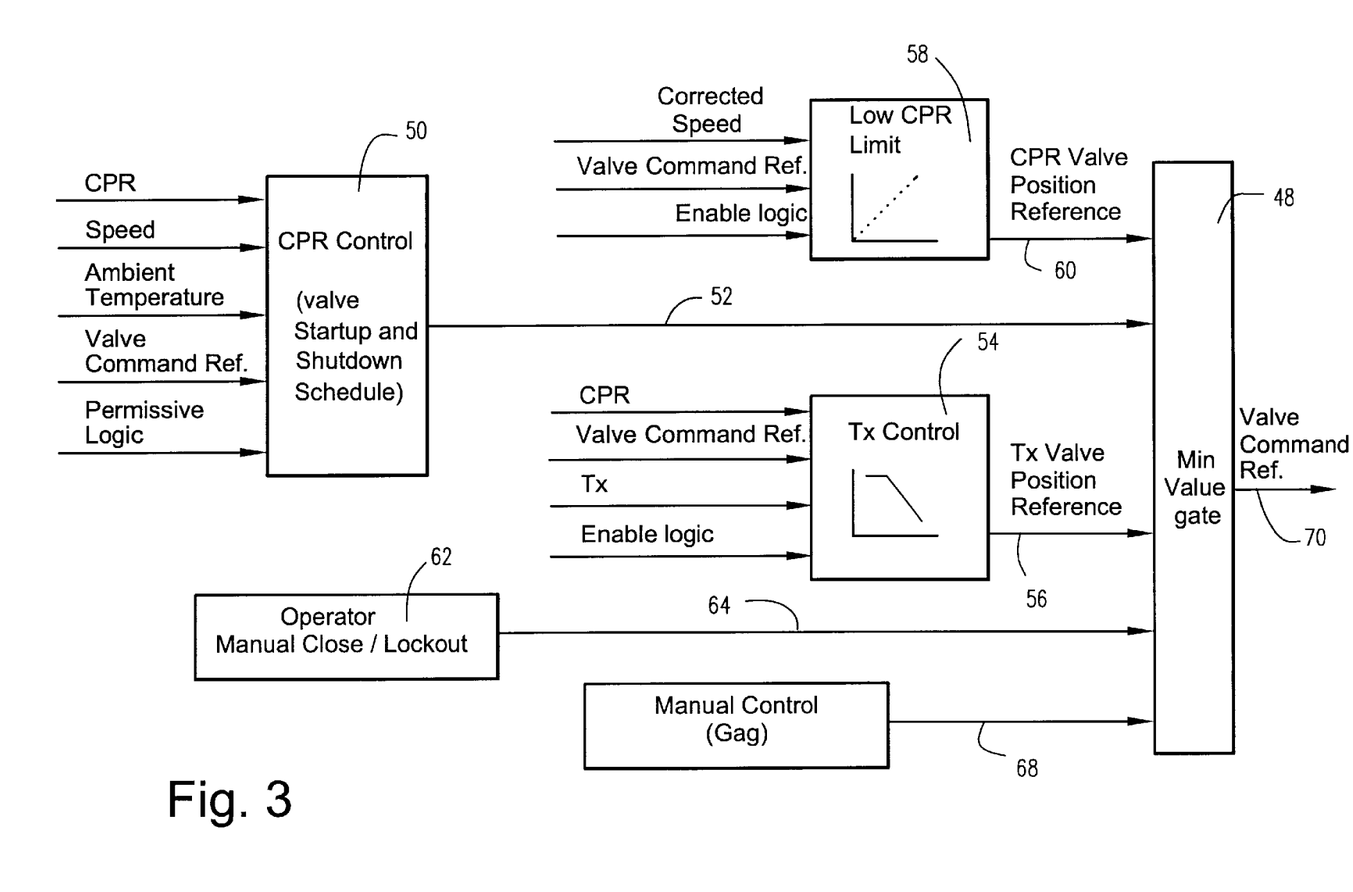
FIG. 3 is a bleed valve minimum value gate diagram in accordance with the invention.

The operation of bleed control valve 30 is controlled by software, provided in the form of five software modules, each implementing a specific control mode. A minimum value gate will continuously determine which mode is in control of the bleed air control valve. In other words, whichever mode calls for the minimum bleed valve stroke will be the active control mode. The five control modes are:

Valve Open/Close Schedule (CPR Control)
Valve Temperature Control
Low CPR Limit
Operator Close/Operator Lockout
Manual Control FIG. 3 illustrates a minimum value gate diagram, with inputs from the five above identified control modes to the minimum value gate 48. Specifically, the Compressor Pressure Ratio (CPR) Control mode software module 50 determines bleed air requirements based on the CPR, turbine rotor speed, ambient temperature, a control valve command reference value (zero, on startup) and permissive logic. A signal representing the required valve stroke (or valve position reference) based on these process parameters is transmitted to the minimum value gate 48 via line 52, primarily to regulate valve position during the startup and shutdown process.

The valve temperature control software module 54 provides an alternative valve position reference based on CPR, a valve command reference, turbine exhaust gas temperature (Tx) and enabling logic. A valve position reference signal is transmitted to the minimum value gate 48 via line 56. This is the main control mode, and this module is responsible for maintaining the desired combustion reference temperature.

The low CPR limit software module 58 provides a third alternative valve position reference as a function of temperature corrected rotor speed, a valve command reference and enabling logic. A signal representing the valve position is sent to the minimum value gate 48 via line 60. This mode is designed to protect the compressor from damage through excessive bleed off.

The operator close/lockout software module 62 sends another valve position reference signal, set by the operator, to the minimum value gate 48 via line 64; and the manual control software module 66 sends a pre-set valve position reference data to the minimum value gate 48 via line 68. Signals from modules 62 and 66 are based on manual valve position settings that may be used as necessary to override the other control modes.

Thus, when the valve temperature control software module 54 is in control, the minimum value gate will maintain the desired combustion temperature. When other modules are in control, it is because other turbine parameters take precedence. The minimum value gate arbitrates between competing bleed requirements and determines which module should have control of the bleed valve. In doing so, the minimum value gate 48 determines the minimum required control valve stroke from among the five above described inputs and sends a signal reflecting that minimum valve stroke to the valve actuating software via line 70.

The operation of the system will now be described for a startup schedule, a shutdown schedule and an unexpected valve closure event.

1. Start-Up Schedule

Figure 4:
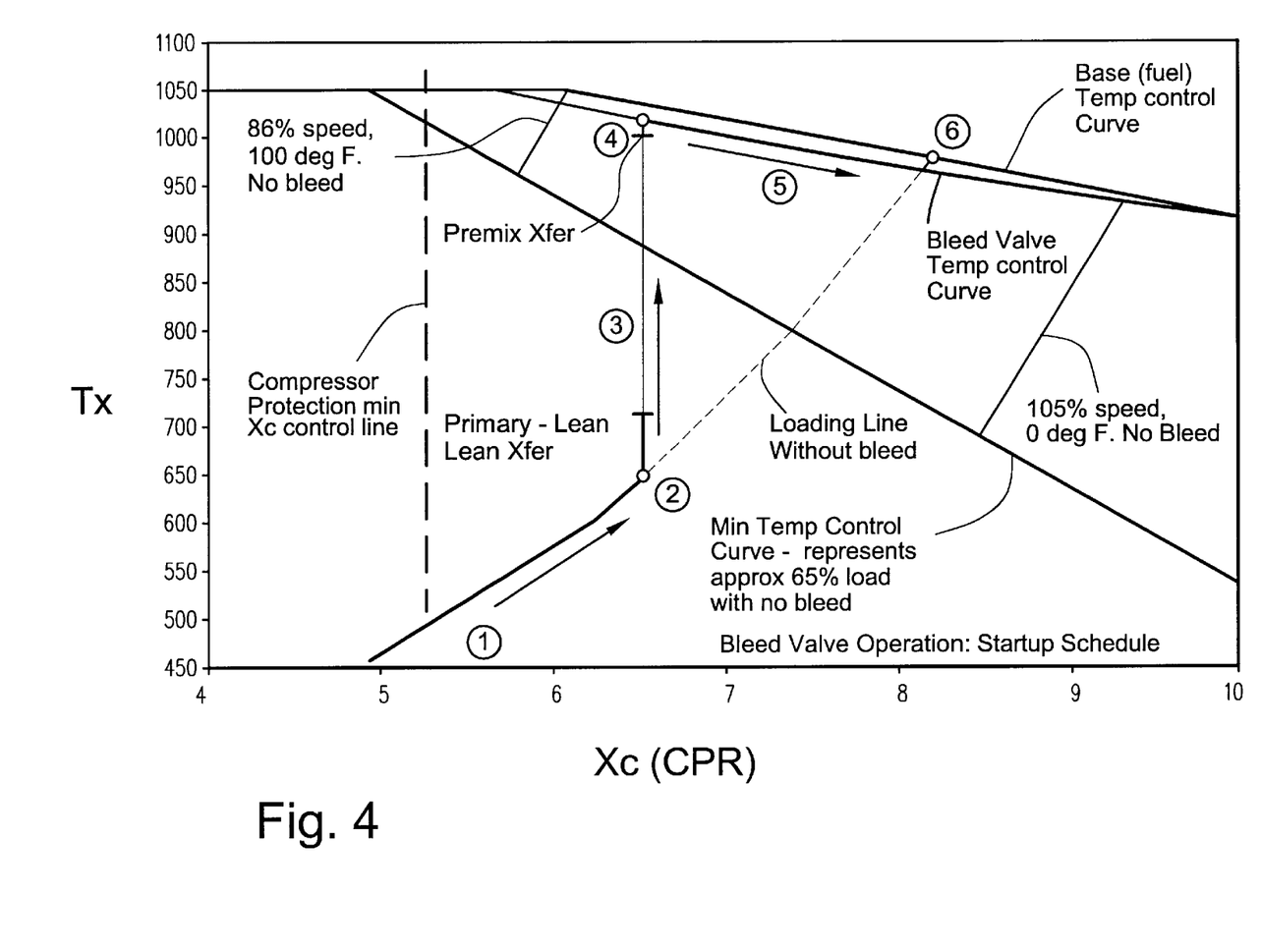
FIG. 4 is a startup schedule diagram utilizing the bleed control valve in accordance with the invention.

With reference now to the diagram in FIG. 4, the turbine will crank, purge, fire, warmup and come up to minimum operating speed as per normal.

After the load compressor case has been pressurized (typically at 4100 rpm), the speed will increase to the initial loading speed of 4500 rpm (93%). The initial loading, indicated at step 1 in the diagram, will take place at this constant speed and will be due to the opening of the suction and discharge valves and the closing of the recycle valves. Once the suction and discharge valves are open and the recycle valves are closed, the loading becomes a function of rotor speed.

The compressor pressure ratio (CPR) when the turbine is at 65% load (min DLN turndown) while on the bleed valve temperature control line, is predicted as a function of speed and ambient temperature. The equation used for the CPR prediction is obtained via curve fitting techniques from a performance map generated from the GTP Cycle Deck.

The predicted CPR becomes a setpoint for the bleed valve CPR control mode. As load increases, and after the CPR setpoint is reached as indicated at step 2 in the diagram, the bleed valve 30 will begin to modulate to control CPR and hold it constant during the loading process, as indicated at step 3. Eventually, the called-for valve position of the CPR control mode will become greater than the called-for position of bleed valve temperature control (see step 4), and bleed valve temperature control will take over. The CPR will again increase as the valve 30 is modulated to control exhaust temperature (Tx), as indicated at step 5.

As load increases, the valve 30 will close to maintain Tx to the bleed valve temperature control curve (TCC) reference, as indicated at step 6. Eventually, the bleed valve 30 will close and load will increase to the fuel temperature control line.

2. Shutdown Schedule

Figure 5:
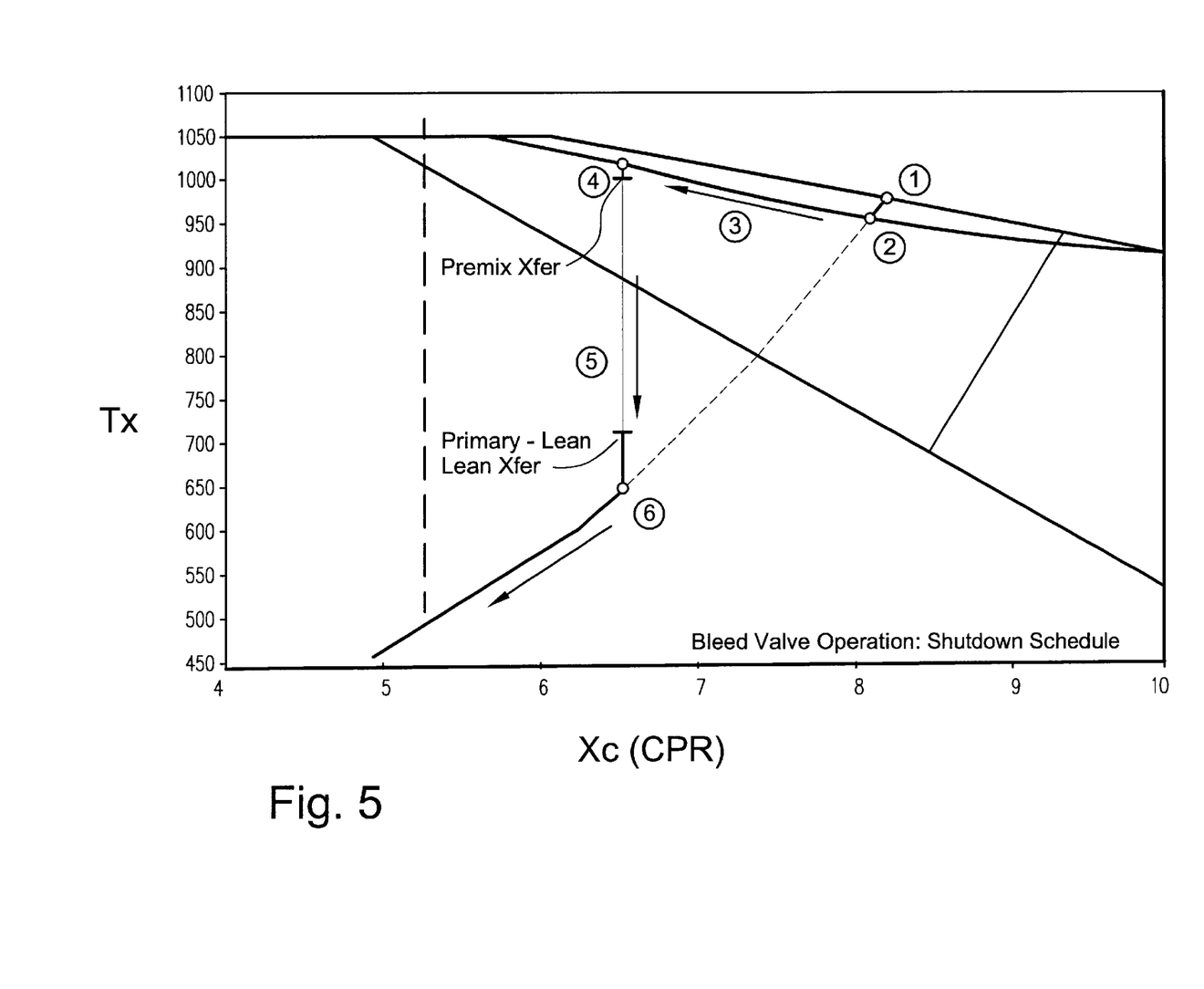
FIG. 5 is a schematic diagram of a shutdown schedule utilizing a bleed valve in accordance with the invention.

With reference to the diagram in FIG. 5, and assuming the unit is operating on base load temperature control when the shutdown command is given (see step 1), the load will decrease until Tx reaches the bleed valve TCC reference (see step 2). At this point, the valve 30 will begin to modulate open to maintain part load Tx (see step 3). Eventually, the called-for valve position of bleed valve temperature control will become greater than the called-for position of the CPR control mode, and CPR control will take over (see step 4). The valve 30 will modulate closed to maintain the CPR setpoint (see step 5). When the load is low enough, the bleed valve will close and unloading will continue, as indicated at step 6.

3. Unexpected Valve Closure Event

Figure 6:
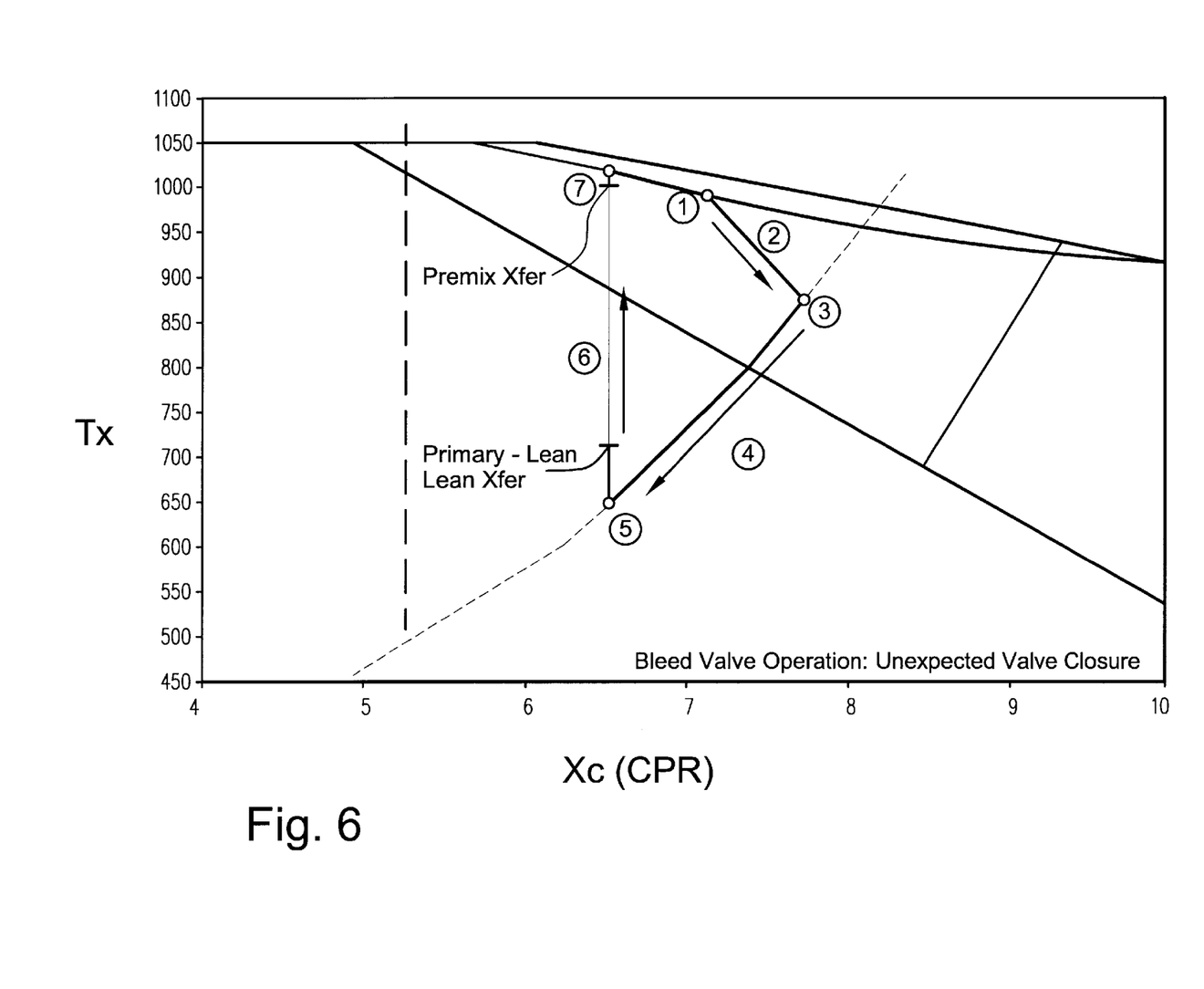
FIG. 6 is a schematic diagram of an unexpected valve closure utilizing the bleed control valve in accordance with the invention.

With reference to the diagram in FIG. 6, it is possible that during premix operation (see step 1), a valve fault could cause the protection sequencing to close the valve 30 unexpectedly (see step 2).

If that occurs, the primary zone will be reignited in a manner similar to the action taken by the secondary load recovery sequencing on a generator drive unit. The bleed valve 30 will close at a controlled rate (see step 3), and load will be maintained by speed control. Once the valve 30 is closed and the turbine is in the lean-lean combustion mode, it will be necessary to re-establish premix operation (assuming the fault has been corrected).

Speed will be ramped to 4500 rpm. As during startup, CPR when the turbine is at 65% load (min DLN turndown) while on the bleed valve temperature control line is predicted as a function of speed and ambient temperature. Load is manually reduced (see step 4) to this point (combustion mode is expected to be primary). Once CPR is at the setpoint value (see step 5), the valve 30 will be permitted to modulate and load will again be increased and premix mode reestablished. It is expected that the load compressor recycle valves will have to be opened to reduce load enough to re-establish premix. The predicted CPR becomes the setpoint for the valve CPR control mode.

As load increases, the bleed valve 30 will begin to modulate to control CPR and hold it constant during the loading process (see step 6). Eventually, the called-for valve position of the CPR control mode will become greater than the called-for position of bleed valve temperature control and temperature control will take over (see step 7).

Thus, the present invention provides a compressor bleed system for gas turbine part load operation, instead of variable inlet guide vanes, that allows optimum DLN combustor operation down to approximately 65% rated load.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a combustor in a gas turbine that receives combustion air from a compressor comprising:
   a) controlling combustion temperature as a function of compressor discharge air bled from the compressor by determining a minimum amount of compressor discharge air required for maintaining a predetermined combustion temperature; and
   b) bleeding compressor discharge air in excess of said minimum amount from said compressor via a control valve.

2. The method of claim 1 wherein step b) is carried out by bleeding air from multiple extraction locations spaced circumferentially about said compressor.

3. The method of claim 1 wherein step a) is carried out by using one or more process parameters to determine a bleed valve temperature reference and using that reference to determine required bleed flow, subject to overrides from other software modules acting through a minimum value selection function that compares multiple inputs, each based on one or more process parameters, and selecting that one of the multiple inputs that provides for the minimum amount of compressor discharge air as a control input to said control valve.

4. The method of claim 3 wherein said process parameters for a first of said multiple inputs include compressor pressure ratio, turbine rotor speed, ambient temperature and a valve command reference value.

5. The method of claim 4 wherein said process parameters for a second of said multiple inputs include compressor pressure ratio, turbine exhaust gas temperature, and a valve command reference.

6. The method of claim 5 wherein said process parameters for a third of said multiple inputs include temperature corrected turbine rotor speed and a valve command reference value.

7. The method of claim 6 wherein fourth and fifth of said multiple inputs include mechanical overrides.

8. The method of claim 1 wherein step b) involves bleeding up to 20–22% of air discharged by the compressor.

9. The method of claim 8 wherein air bled from the compressor is added to the gas turbine exhaust stack.

10. A method of operating a combustor in a gas turbine that receives combustion air from a compressor comprising:
   a) controlling combustion temperature as a function of compressor discharge air bled from the compressor by determining a minimum amount of compressor discharge air required for maintaining a predetermined minimum combustion temperature; and
   b) bleeding compressor discharge air in excess of said minimum from said compressor via a control valve;
   wherein step a) is carried out by using one or more process parameters to determine a bleed valve temperature reference and using that reference to determine required bleed flow, subject to overrides from other software modules acting through a minimum value selection function that compares multiple inputs, each based on one or more process parameters, and selecting that one of the multiple inputs that provides for the minimum amount of compressor discharge air as a control input to said control valve; and wherein step b) includes bleeding air from multiple extraction locations spaced circumferentially about said compressor.

11. The method of claim 10 wherein step b) involves bleeding up to 20–22% of compressor discharge air.

12. The method of claim 11 and further comprising utilizing a stop valve in conjunction with said control valve to halt step b) upon faulty operation of said control valve.

13. The method of claim 12 wherein said process parameters for a first of said multiple inputs include compressor pressure ratio, turbine rotor speed, ambient temperature and a valve command reference value.

14. The method of claim 13 wherein said process parameters for a second of said multiple inputs include compressor pressure ratio, turbine exhaust gas temperature, and a valve command reference.

15. The method of claim 14 wherein said process parameters for a third of said multiple inputs include temperature corrected turbine rotor speed and a valve command reference value.

16. The method of claim 15 wherein fourth and fifth of said multiple inputs include mechanical overrides.

* * * * *